US012610424B2

(12) United States Patent
Cui et al.

(10) Patent No.: US 12,610,424 B2
(45) Date of Patent: Apr. 21, 2026

(54) POSITIONING SRS TRANSMISSIONS DURING A DISCONTINUOUS RECEPTION CYCLE

(71) Applicant: Apple Inc., Cupertino, CA (US)

(72) Inventors: Jie Cui, San Jose, CA (US); Dawei Zhang, Saratoga, CA (US); Hong He, San Jose, CA (US); Manasa Raghavan, Sunnyvale, CA (US); Weidong Yang, San Diego, CA (US); Yang Tang, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 729 days.

(21) Appl. No.: 17/444,297

(22) Filed: Aug. 3, 2021

(65) Prior Publication Data

US 2022/0046748 A1     Feb. 10, 2022

Related U.S. Application Data

(60) Provisional application No. 63/061,269, filed on Aug. 5, 2020.

(51) Int. Cl.
*H04W 76/28* (2018.01)
*H04L 5/00* (2006.01)
(Continued)

(52) U.S. Cl.
CPC ........... *H04W 76/28* (2018.02); *H04L 5/0048* (2013.01); *H04W 4/029* (2018.02); *H04W 56/002* (2013.01)

(58) Field of Classification Search
None
See application file for complete search history.

(56) References Cited

U.S. PATENT DOCUMENTS

2009/0232118 A1*   9/2009   Wang ................ H04W 52/0216
                                                            370/352
2011/0237266 A1*   9/2011   Cai ........................ H04W 76/28
                                                            455/450
(Continued)

FOREIGN PATENT DOCUMENTS

CN           101971554           2/2011
CN           104335631           2/2015
(Continued)

OTHER PUBLICATIONS

Huawei et al., "Summary for MAC proposals under 6.8.2.5", 3GPP TSG-RAN WG2 109bis-e, R2-2004208, Apr. 30, 2020, 9 sheets.
(Continued)

*Primary Examiner* — Chirag G Shah
*Assistant Examiner* — Suk Jin Kang
(74) *Attorney, Agent, or Firm* — Fay Kaplun & Marcin, LLP

(57)     ABSTRACT

A base station of a network acts as a serving node for a user equipment (UE). The UE is a target UE in a positioning method initiated by the network. The base station compares discontinuous reception (DRX) timing information for a DRX cycle of the UE with positioning sounding reference signal (SRS) timing information for an SRS configuration of the UE, determines whether the positioning SRS is located within an inactive time of the DRX cycle and when the positioning SRS is located within the inactive time of the DRX cycle, modifies one of the DRX cycle or the SRS configuration.

18 Claims, 6 Drawing Sheets

(51) Int. Cl.
    *H04W 4/029*      (2018.01)
    *H04W 56/00*      (2009.01)

(56) References Cited

U.S. PATENT DOCUMENTS

| | | | |
|---|---|---|---|
| 2012/0087341 A1 | 4/2012 | Jang et al. | |
| 2013/0223311 A1 | 8/2013 | Wang et al. | |
| 2016/0128129 A1 | 5/2016 | Kahtava et al. | |
| 2018/0295581 A1* | 10/2018 | Krishnamoorthy | H04W 52/0241 |
| 2019/0182794 A1* | 6/2019 | Wong | H04W 52/0216 |
| 2019/0230619 A1* | 7/2019 | Cui | H04W 64/00 |
| 2019/0253909 A1 | 8/2019 | Yiu et al. | |
| 2019/0327673 A1* | 10/2019 | Bitra | G01S 5/10 |
| 2019/0373572 A1* | 12/2019 | Cui | G01S 5/0236 |
| 2020/0137821 A1 | 4/2020 | Cirik et al. | |
| 2020/0358576 A1* | 11/2020 | Zarifi | H04L 5/0048 |
| 2021/0050978 A1* | 2/2021 | Manolakos | H04L 5/0048 |
| 2021/0084608 A1* | 3/2021 | Cui | H04W 24/10 |
| 2021/0242913 A1* | 8/2021 | Manolakos | H04L 5/0064 |
| 2021/0314800 A1* | 10/2021 | Manolakos | H04L 5/0092 |
| 2021/0329618 A1* | 10/2021 | Chervyakov | G01S 5/0221 |
| 2021/0345323 A1 | 11/2021 | Axmon et al. | |
| 2021/0360733 A1* | 11/2021 | Bao | H04W 52/0216 |
| 2021/0410063 A1* | 12/2021 | Bao | G01S 5/0018 |
| 2021/0410098 A1* | 12/2021 | Bao | H04W 52/028 |
| 2022/0006583 A1* | 1/2022 | Manolakos | G01S 5/02 |
| 2022/0029763 A1* | 1/2022 | Manolakos | H04L 5/0094 |
| 2022/0050163 A1* | 2/2022 | Si | H04W 24/02 |
| 2022/0061122 A1* | 2/2022 | Bao | H04L 5/005 |
| 2022/0078650 A1 | 3/2022 | Lee et al. | |
| 2022/0095265 A1* | 3/2022 | Cha | H04L 5/0051 |
| 2022/0132463 A1* | 4/2022 | Cha | H04B 17/27 |
| 2022/0150865 A1* | 5/2022 | Cha | H04W 64/006 |
| 2022/0174641 A1* | 6/2022 | Cha | H04L 5/005 |
| 2022/0209927 A1 | 6/2022 | Shreevastav et al. | |
| 2022/0368496 A1* | 11/2022 | Shreevastav | H04L 5/0094 |
| 2022/0399976 A1* | 12/2022 | Wang | H04W 76/28 |
| 2022/0417853 A1* | 12/2022 | Kumar | H04W 52/0232 |
| 2023/0035967 A1* | 2/2023 | Manolakos | G01S 5/0226 |
| 2023/0038050 A1* | 2/2023 | Si | H04W 24/04 |
| 2023/0041767 A1* | 2/2023 | Manolakos | H04W 76/28 |
| 2023/0067569 A1* | 3/2023 | Manolakos | H04W 64/00 |
| 2023/0103460 A1* | 4/2023 | Manolakos | H04W 76/28 370/311 |
| 2023/0276226 A1* | 8/2023 | Li | H04W 8/24 370/328 |

FOREIGN PATENT DOCUMENTS

| | | |
|---|---|---|
| CN | 109691201 | 4/2019 |
| WO | 2009114800 | 9/2009 |
| WO | 2013/153513 | 10/2013 |
| WO | 2018/044455 | 3/2018 |

OTHER PUBLICATIONS

Vivo, "Discussion on SRS for positioning during the DRX inactive period", 3GPP RAN WG2, R2-2004461, Jun. 2020, 4 sheets.

Apple, "On positioning SRS transmission in DCRX", 3GPP RAN WG4, R4-2009914, Aug. 2020, 3 sheets.

Huawei et al, "Remaining issues in the MAC spec", 3GPP TSG RAN WG2 #110-e, R2-2005092, May 22, 2020, 3 sheets.

Qualcomm Incorporated, "Semi-persistent and aperiodic SRS-for-positioning", 3GPP TSG-RAN WG2 Meeting #109-e, R2-2001214, Feb. 14, 2020, 16 sheets.

"3rd Generation Partnership Project: Technical Specification Group Radio Access Network, NR; Requirements for support of radio resource management (Release 15". 3GPP RAN WG4; TS 38.133; V1.0.0, Dec. 15, 2017. 39 sheets.

Samsung, "CR on Semi-Persistent CSI Reporting and SRS for DRX", 3GPP TSG-RAN WG2 Meeting #102, R2-1807601, May 11, 2018, 5 sheets.

Vivo, "Idle and Inactive Mode Positioning", 3GPP TSG-RAN WG2 Meeting #105, R2-1900500, Feb. 15, 2019, 4 sheets.

\* cited by examiner

Network Arrangement 100

IMS 150

Network Services Backbone 160

Cellular Core Network 130

Internet 140

5G-NR-RAN 120

LTE-RAN 122

WLAN 124 gNB 120A gNB 120B eNB 122A eNB 122B

UE 110

400

404b
gNB$_2$
$(x_2, y_2)$ $\tau_2$

404a
$\tau_1$   gNB$_1(x_1, y_1)$

402
UE in unknown location (x,y)

$\tau_3$ 404c
gNB$_3(x_3, y_3)$

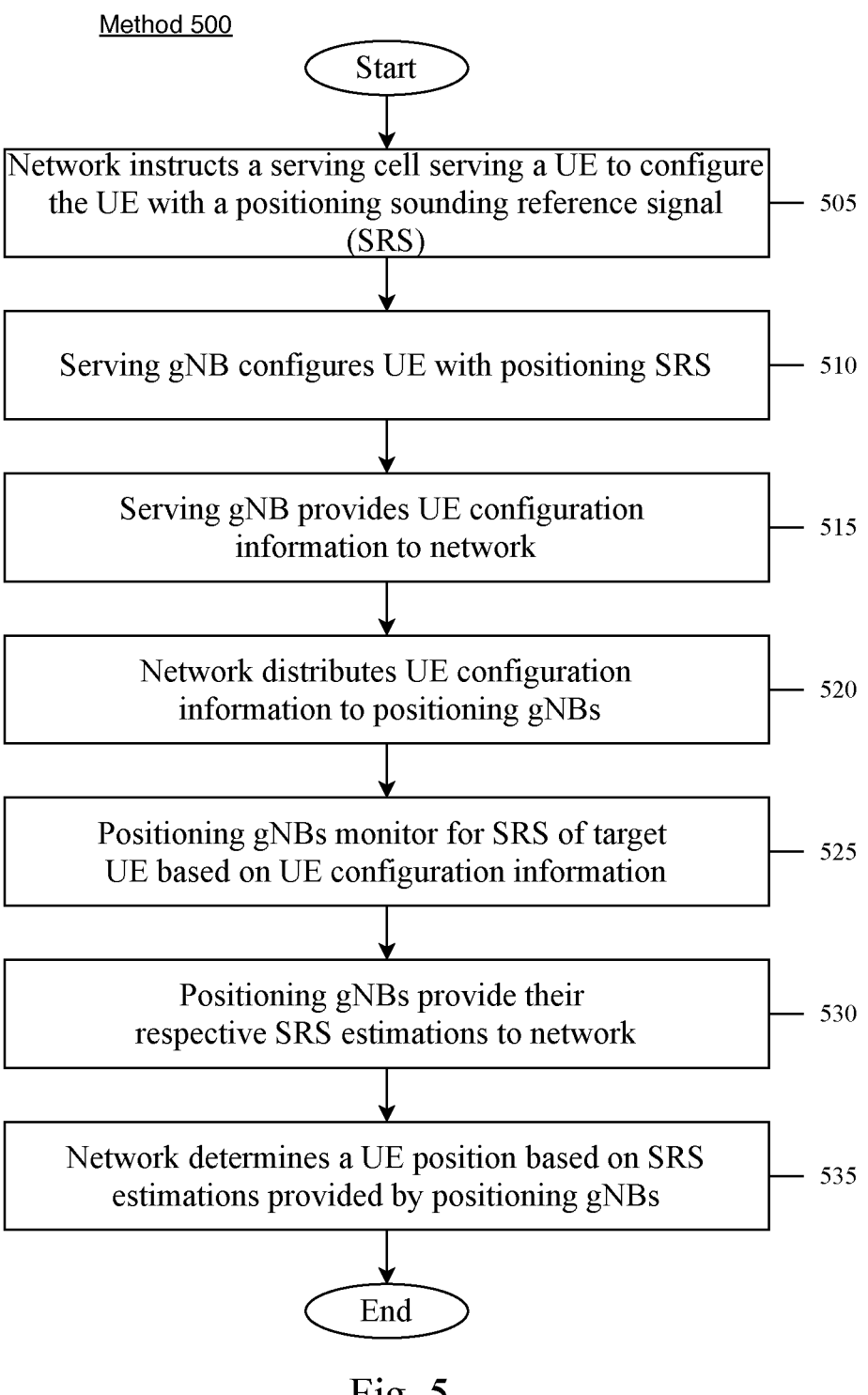

Method 500

Start

Network instructs a serving cell serving a UE to configure the UE with a positioning sounding reference signal (SRS) — 505

Serving gNB configures UE with positioning SRS — 510

Serving gNB provides UE configuration information to network — 515

Network distributes UE configuration information to positioning gNBs — 520

Positioning gNBs monitor for SRS of target UE based on UE configuration information — 525

Positioning gNBs provide their respective SRS estimations to network — 530

Network determines a UE position based on SRS estimations provided by positioning gNBs — 535

End

Fig. 5

Method 600

Start

After configuring SRS for UE, serving gNB checks UE DRX status and periodical or SP positioning SRS configurations for UE — 605 gNB compares DRX and SRS configurations — 610

615 — Serving gNB changes DRX configuration of UE

Serving gNB changes UE periodical or SP positioning SRS — 620

End

POSITIONING SRS TRANSMISSIONS DURING A DISCONTINUOUS RECEPTION CYCLE

PRIORITY/INCORPORATION BY REFERENCE

This application claims priority to U.S. Provisional Patent Application Ser. No. 63/061,269 filed on Aug. 5, 2020 and entitled "Positioning SRS Transmissions During a Discontinuous Reception Cycle," the entirety of which is incorporated herein, by reference.

BACKGROUND

A user equipment (UE) may establish a connection to at least one of a plurality of different networks or types of networks. Various positioning methods exist for the network to locate the UE. In some positioning methods, including multiple round trip time (RTT) and Uplink Time Difference of Arrival (UTDOA), a sounding reference signal (SRS) is transmitted from a target UE to each of multiple network nodes, i.e. positioning nodes, so that the uplink arrival timings of the respective SRSs at the positioning nodes may be determined, and a location of the UE determined therefrom.

To locate the UE, the network may request a serving node for a UE to configure the UE for the positioning SRS transmission. The network may receive the SRS configuration from the serving node and inform the positioning nodes of the SRS configuration so that the positioning nodes may monitor for the SRS from the UE. However, the network may not have precise information regarding when the UE will transmit the SRS and when the UE will not transmit the SRS. For example, the UE may not transmit periodic or semi-persistent SRS during a discontinuous reception (DRX) inactive period. Additionally, the UE may not transmit periodic, semi-persistent, or aperiodic SRS during a measurement gap (MG). If the network is not informed of the times when the UE cannot transmit the SRS then positioning node resources may be wasted if the positioning nodes monitor for the SRS during these times.

SUMMARY

Some exemplary aspects are related to a base station of a network acting as a serving node for a user equipment (UE), the UE being a target UE in a positioning method initiated by the network. The base station includes one or more processors that are configured to compare discontinuous reception (DRX) timing information for a DRX cycle of the UE with positioning sounding reference signal (SRS) timing information for an SRS configuration of the UE, determine whether the positioning SRS is located within an inactive time of the DRX cycle and when the positioning SRS is located within the inactive time of the DRX cycle, modifying one of the DRX cycle or the SRS configuration.

Other exemplary aspects are related a method performed by a base station of a network acting as a serving node for a user equipment (UE), the UE being a target UE in a positioning method initiated by the network. The method includes comparing discontinuous reception (DRX) timing information for a DRX cycle of the UE with positioning sounding reference signal (SRS) timing information for an SRS configuration of the UE, determining whether the positioning SRS is located within an inactive time of the DRX cycle and when the positioning SRS is located within the inactive time of the DRX cycle, modifying one of the DRX cycle or the SRS configuration.

Still further exemplary aspects are related to a base station of a network acting as a serving node for a user equipment (UE), the UE being a target UE in a positioning method initiated by the network. The base station has one or more processors configured to transmit, to a location management function (LMF) of the network, first information including discontinuous reception (DRX) timing information for indicating a DRX active time and a DRX inactive time in a DRX cycle of the UE and transmit, to the LMF of the network, measurement gap (MG) timing information for the UE.

Other exemplary aspects are related to a user equipment having one or more processors that perform operations. The operations include storing a configuration related to positioning sounding reference signals (SRS) and transmitting positioning SRS according to the configuration information.

BRIEF DESCRIPTION OF THE DRAWINGS

FIG. 5 shows a method for locating a user equipment (UE).

DETAILED DESCRIPTION

Figure 1:
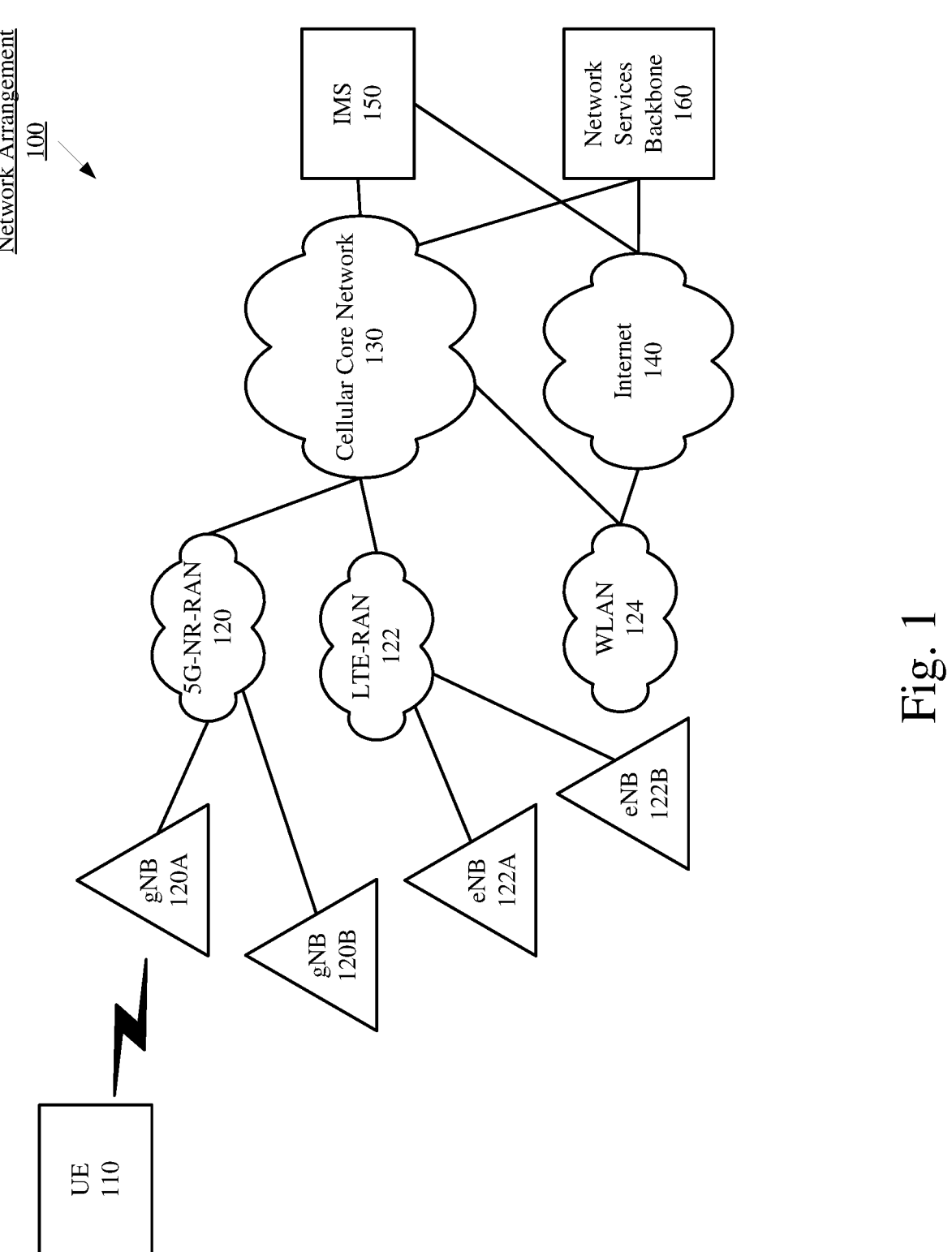
FIG. 1 shows a network arrangement according to various exemplary aspects.

The exemplary aspects may be further understood with reference to the following description and the related appended drawings, wherein like elements are provided with the same reference numerals. The exemplary aspects describe network configurations for monitoring for a positioning sounding reference signal (SRS) transmission from a user equipment UE. Specifically, the exemplary aspects describe configurations for positioning nodes to monitor for a positioning SRS from a target UE during a positioning method implemented by the network for the target UE. The positioning nodes may receive information from the network relating to periods when the UE will or will not send the positioning SRS. The information may include a discontinuous reception (DRX) configuration for the UE, a measurement gap (MG) configuration for the UE, and/or other information, to be explained in detail below, that affect the periods when the UE is allowed or prevented from sending the positioning SRS.

The exemplary aspects are described with regard to a user equipment (UE). However, the use of a UE is provided for illustrative purposes. The exemplary aspects may be utilized with any electronic component that may establish a connection with a network and is configured with the hardware, software, and/or firmware to exchange information and data with the network. Therefore, the UE as described herein is used to represent any electronic component that is capable of providing positioning SRS to a network cell so that the network cell may perform positioning measurements for the UE.

The exemplary aspects are described with regard to the network being a 5G New Radio (NR) network and a base station being a next generation Node B (gNB). The 5G NR network may utilize a discontinuous reception cycle (DRX) and a measurement gap (MG) and configure connected UEs accordingly. The 5G NR network may also utilize various positioning methods for locating connected UEs. However, the use of the 5G NR network, the gNB, the DRX cycle, the MG, and the described positioning methods are provided for illustrative purposes. The exemplary aspects may apply to any type of network that utilizes similar functionalities.

In addition, throughout this description, a gNB may be referred to as a "serving cell." A gNB that is acting as a serving cell is the cell to which a UE is currently connected, e.g., the UE may be in a Radio Resource Control (RRC) Connected state with the gNB and may be actively exchanging data and/or control information with the cell. A gNB may also be referred to as a "positioning gNB," a "positioning node" or a "positioning cell." A gNB acting as a positioning cell is a cell that is assisting in locating the UE, e.g., receiving positioning SRS signals from the UE to assist in locating the UE. A gNB may simultaneously act as a serving cell and a positioning cell with respect to a UE or may act only as a positioning cell for a UE.

Furthermore, throughout this description, the terms "positioning SRS" or "SRS" are used to describe the signals transmitted by the UE to allow the network to locate the UE. Those skilled in the art will understand that the SRS be also be used for other purposes in addition to location, e.g., channel estimation. Thus, the positioning SRS described herein are not limited to any specific type of SRS.

FIG. 1 shows an exemplary network arrangement 100 according to various exemplary aspects. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary aspects, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. Reference to two gNBs 120A, 120B is merely for illustrative purposes. The exemplary aspects may apply to any appropriate number of gNBs. For example, three or more gNBs may be utilized as positioning gNBs for estimating positioning SRS transmitted from a target UE. The positioning gNBs may then provide their respective measurements, e.g. SRS estimations, to the network so that the network may determine a location of the target UE therefrom, to be described in further detail below.

In addition to the networks 120, 122 and 124 the network arrangement 100 also includes a cellular core network 130, the Internet 140, an IP Multimedia Subsystem (IMS) 150, and a network services backbone 160. The cellular core network 130, e.g. the 5GC for the 5G NR network, may be considered to be the interconnected set of components that manages the operation and traffic of the cellular network. The cellular core network 130 also manages the traffic that flows between the cellular network and the Internet 140. The core network 130 may include a location management function (LMF) to support location determinations for a UE. As will be described further below, in the exemplary aspects described herein, the LMF may instruct a serving cell to configure a target UE for SRS transmission, provide information to a plurality of positioning gNBs to monitor for and estimate the positioning SRS, receive the SRS measurements from the positioning gNBs and determine a position of the target UE from the SRS measurements.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
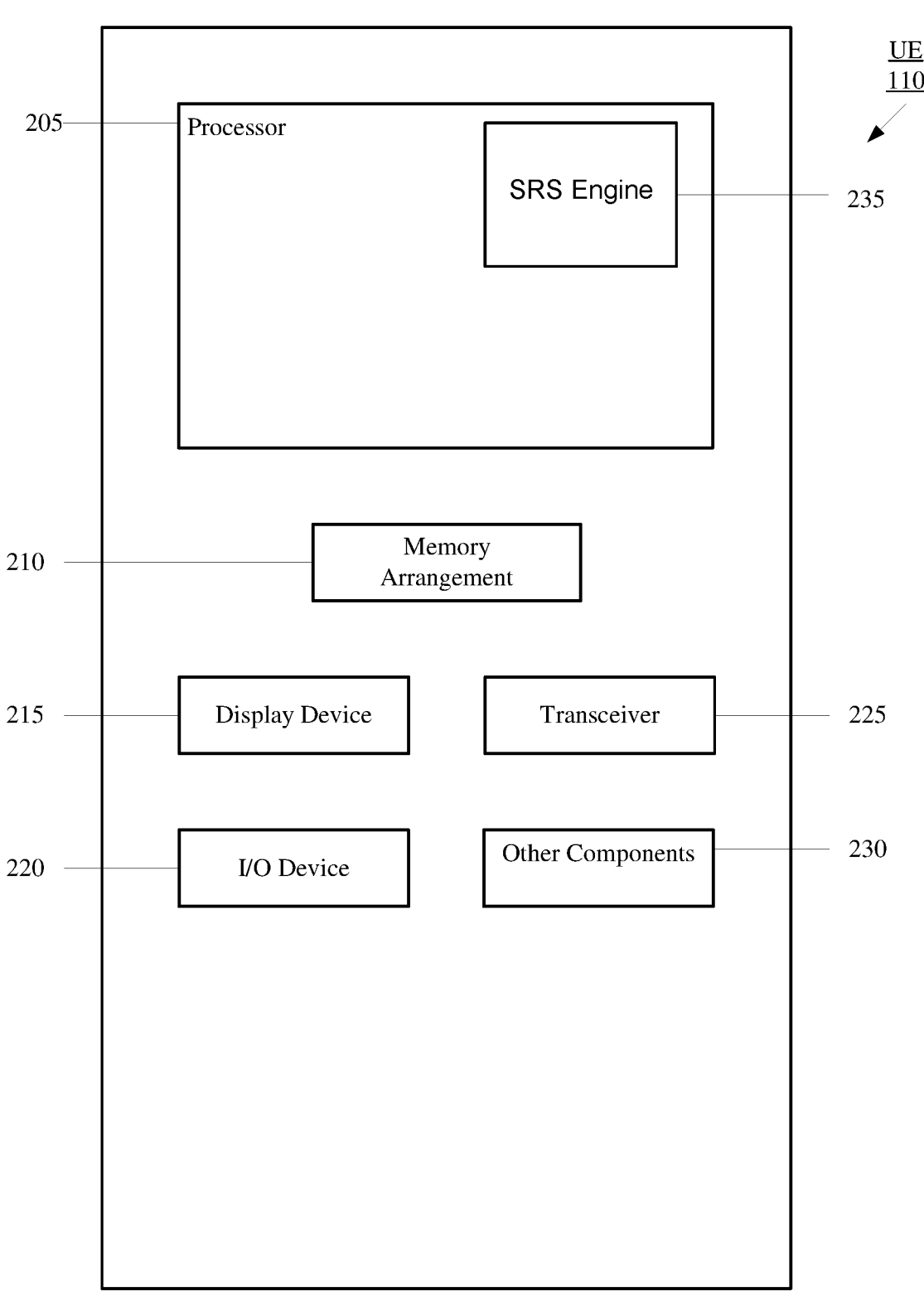
FIG. 2 shows an exemplary UE according to various exemplary aspects.

FIG. 2 shows an exemplary UE 110 according to various exemplary aspects. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include an SRS engine 235 for transmitting positioning SRS to each of a plurality of positioning nodes based on a network configuration for the positioning SRS. The positioning SRS is estimated by the positioning nodes to provide the network with information so that the network may determine a location of the UE, to be described in further detail below.

The above referenced engine being an application (e.g., a program) executed by the processor 205 is only exemplary.

The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary aspects may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
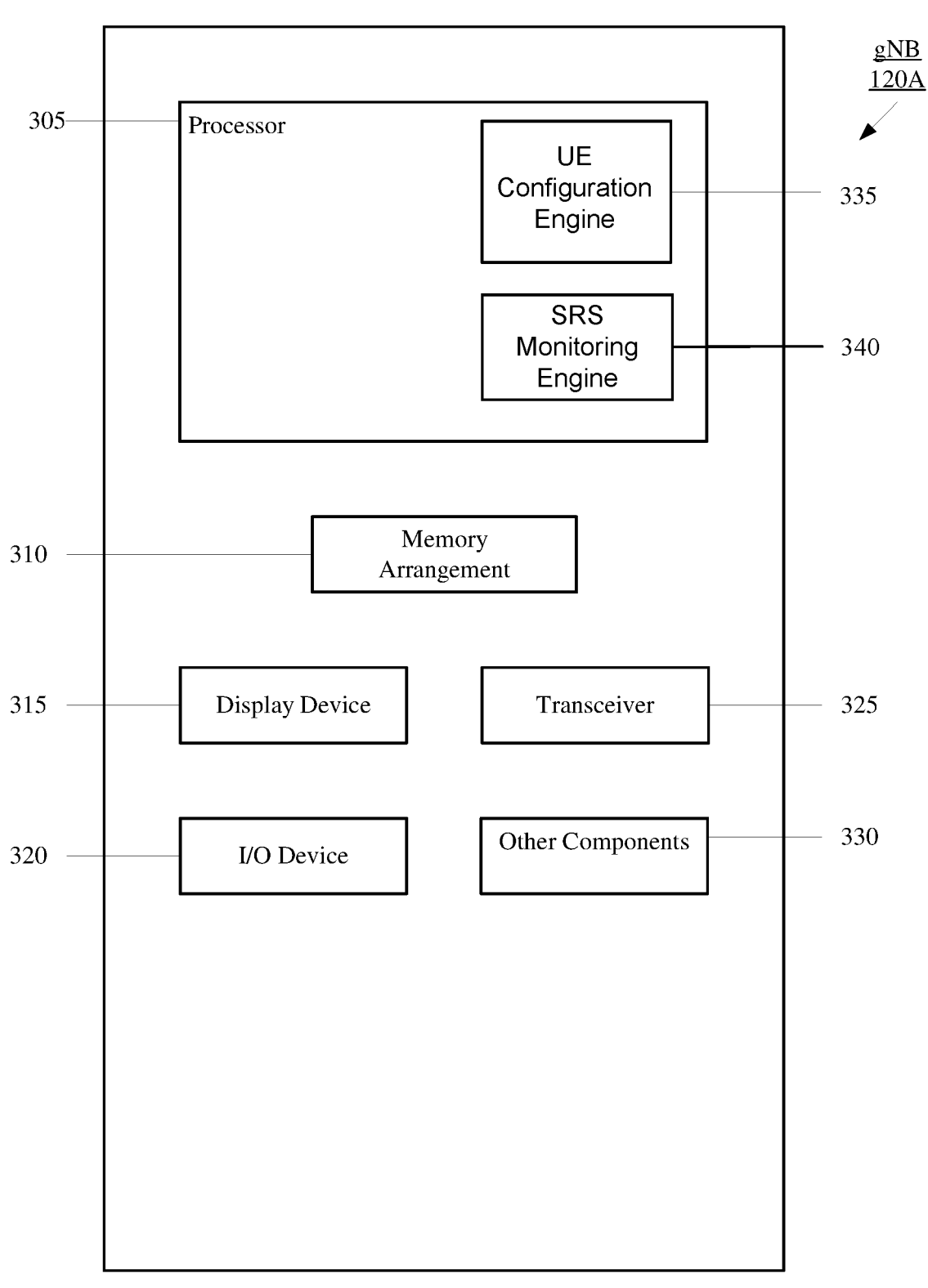
FIG. 3 shows an exemplary network cell according to various exemplary aspects.

FIG. 3 shows an exemplary network cell, in this case gNB 120A, according to various exemplary aspects. As noted above with regard to the UE 110, the gNB 120A may represent a serving cell for the UE 110. The gNB 120A may represent any access node of the 5G NR network through which the UE 110 may establish a connection and manage network operations. Additionally, the gNB 120A may represent a positioning node used in a positioning method implemented by the network to locate a target UE. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, when the gNB 120A is a serving cell for a UE, the engines may include a UE configuration engine 335 for providing UE configuration information to the network, for example, information relating to periods when the UE is in a DRX inactive mode or has a measurement gap (MG). The network may then distribute the information to positioning nodes so that the positioning nodes may monitor. When the gNB 120A is a positioning cell being used by the network to locate a UE, the engines may also include an SRS monitoring engine 340 for receiving the UE configuration information from the network and monitoring for positioning SRS from the UE in accordance therewith. For example, the gNB 120A may determine a period during which it will monitor for the positioning SRS and a period during which it will not monitor for the positioning SRS based on the UE configuration information, to be described in further detail below, and estimate the positioning SRS when it is received from the UE.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

As discussed above, a UE may be configured with a discontinuous reception (DRX) cycle to save power. The DRX cycle utilizes an active mode of data exchange processing and a sleep mode of inactivity. The UE may use the active mode of processing at defined intervals to perform scheduled operations such as performing measurements related to the network conditions, transmitting (e.g., requests, measurement reports, uplink data etc.), and receiving (e.g. control channel information, reference signals, synchronization signals, downlink data, etc.). The time period that the UE may be scheduled to receive control channel information may be termed the OnDuration for the DRX cycle, or a DRX active time. The OnDuration relates to a duration during which the UE may perform operations that enable the UE to receive data that may be transmitted to the UE such as but not limited to, control channel information, an uplink grant, a downlink grant, reference signals, synchronization signals, payload data etc.

During the DRX cycle, when an OnDuration is not scheduled the UE may have an opportunity to utilize the sleep mode of inactivity and conserve power. This period may be referred to as a DRX inactive time. However, reference to a DRX cycle is for illustrative purposes, and different networks may refer to similar concepts by a different name. The exemplary aspects may apply to any scenario in which the UE transitions between a power saving mode, where certain operations are suspended, and an active mode, where the operations are resumed, with regard to data exchange processing.

The DRX cycle may have a predetermined duration N such as 100 milliseconds (ms), 50 ms, 40 ms, 20 ms, etc. For example, at a time 0, there may be a OnDuration during which the active mode of processing is used. Subsequently, upon the conclusion of the OnDuration, the UE has an opportunity to utilize the sleep mode of inactivity. Then at a time N, there may be another OnDuration. Subsequently, the sleep mode is used until a time 2N. This process continues for the duration of the DRX cycle. Reference to the sleep mode of inactivity does not necessarily mean putting the processor, the transmitter, and the receiver of the UE to sleep, in hibernation, or in deactivation. For example, the processor (e.g., baseband and/or application) may continue to execute other applications or processes. The sleep mode relates to conserving power by discontinuing a continuous processing functionality relating to operations that enable the UE to receive data that may be transmitted to the UE and transmit data to the network. Further, reference to the DRX cycle being configured in ms units is merely for illustrative purposes, the exemplary aspects may utilize a DRX cycle that is based on subframes or any other suitable unit of time.

A UE may further be configured with a measurement gap (MG) for performing frequency measurements while other capabilities, such as transmitting/receiving data, are suspended. The measurement gap configuration may depend on the capability of the UE, the active BWP and/or the operating frequency. The measurement gap may be of a predefined duration and repeat periodically. Typically, a UE will tune away from a currently connected network or frequency band during the measurement gap to measure signals associated with other networks and/or at different frequencies than on which it is currently operating. During this measurement gap, the UE is not available to the currently connected network, e.g., it is neither transmitting signals to nor receiving signals from the currently connected network.

In some methods for determining a position of a user equipment (UE), such as multiple round trip time (RTT) positioning or Uplink Time Difference of Arrival (UTDOA), a positioning SRS is transmitted from a target UE to a plurality of network nodes so that each of the nodes can estimate the uplink arrival timing from the UE. The network may then use the information provided by the positioning nodes to determine a position of the UE.

Figure 4:
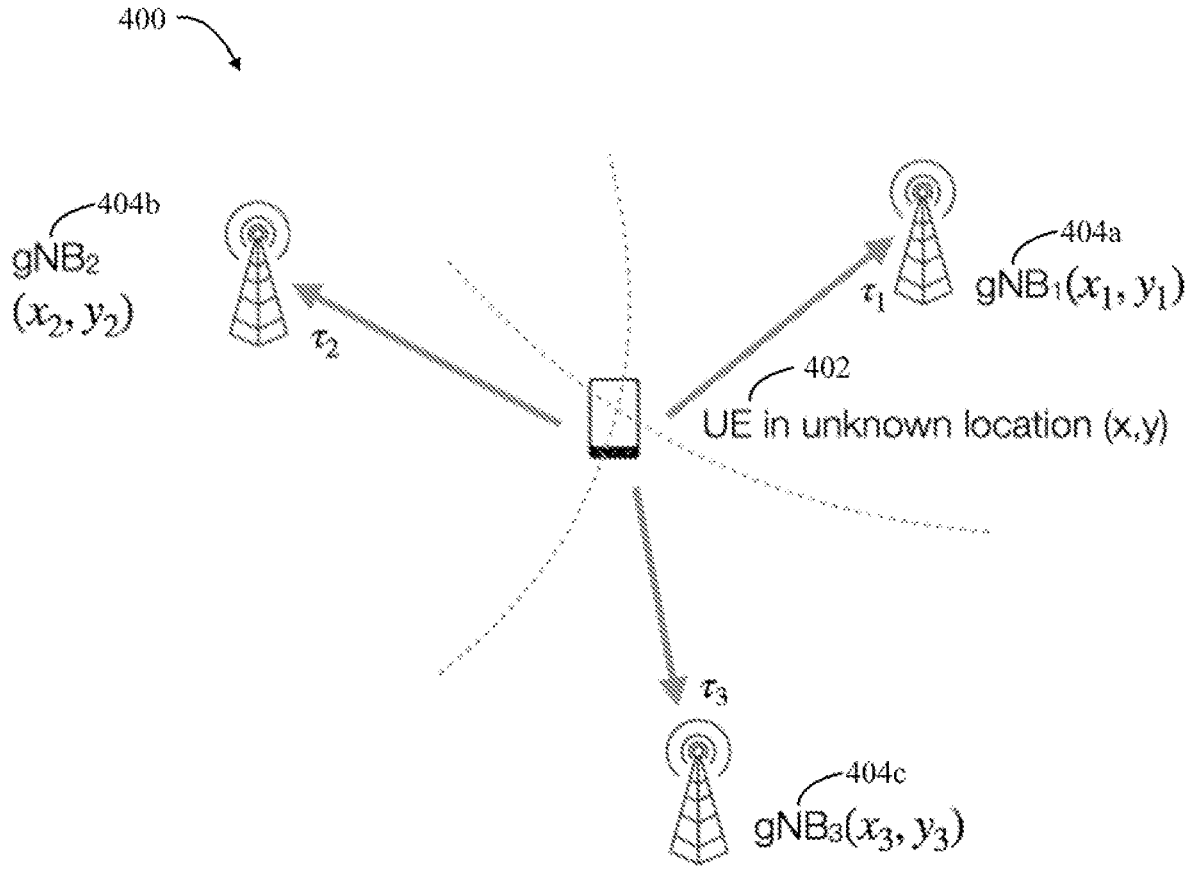
FIG. 4 shows a network arrangement including a UE and three gNBs utilized in a positioning determination for the UE.

FIG. 4 shows a network arrangement 400 including a UE 402 and three gNBs 404 utilized in a positioning determination for the UE 402. In the example of FIG. 4, it may be considered that the UE 402 may be similar to the UE 110 described with reference to FIGS. 1 and 2. It may also be considered that the gNBs 404 may be similar to the gNB 120A and 120B described with reference to FIGS. 1 and 3. In the arrangement 400, the gNB 404a is a serving cell for the UE 402 and gNBs 404b and 404c may be configured by the network to be utilized as positioning nodes. The gNB 404a may also be used as a positioning node in the positioning method. The positioning gNBs 404b and 404c are configured to listen for and estimate positioning SRS transmitted from the UE 402 and provide the measurements to the network, for example via a location management function (LMF) at the 5G core network (5GC). The LMF may be considered a positioning server for coordinating the positioning SRS transmissions from the UE, providing information to the positioning nodes for monitoring for the positioning SRS, and receiving SRS estimations from the positioning nodes.

In a typical positioning method, such as multiple RTT or UTDOA, the LMF may request the serving gNB 404a to configure the UE 402 for the positioning SRS transmission, and knows the positioning SRS configuration from the serving gNB 404a. The LMF distributes the positioning SRS configuration information to all of the positioning gNBs 404 so that, when the UE 402 transmits the positioning SRS to the positioning gNBs, the gNBs 404 may estimate the positioning SRS from the target UE 402 based on the information provided by the LMF.

One potential issue for these exemplary positioning methods is whether the LMF knows the exact information pertaining to when the UE will transmit the positioning SRS and/or when the UE will not transmit the positioning SRS. If the LMF is unaware of when the UE cannot transmit the SRS, gNB resources may be wasted when monitoring the positioning SRS from the UE.

In some exemplary aspects, a UE will not transmit periodic positioning SRS and semi-persistent (SP) positioning SRS outside the DRX active time, but may transmit aperiodic SRS (if configured by network) regardless of the DRX status. If positioning SRS transmissions follow these exemplary aspects, the positioning gNBs that are not serving cells for the UE will not understand when the UE will be transmitting SRSs.

The exemplary aspects relate to providing information to positioning gNBs for establishing monitoring periods to monitor for positioning SRS from a target UE, for example, in a positioning method for the target UE implemented by the network. The gNB monitoring may be dependent on a UE configuration for a DRX cycle and/or a measurement gap where the UE may be unable to transmit the positioning SRS. Each of these exemplary aspects will be described in greater detail below.

FIG. 5 shows a method 500 for locating a user equipment (UE). The method 500 will be described with reference to the network arrangement 400. In 505, a network (e.g., the LMF of core network 130) instructs a serving cell (e.g., gNB 404a) serving a UE (e.g., UE 402) to configure the UE 402 with a positioning SRS.

In 510, the serving gNB 404a configures the UE 402 with the positioning SRS. For example, the UE 402 may be configured with time domain and frequency domain resources to transmit the positioning SRS. In 515, the serving gNB 404a provides UE 402 configuration information to the network, e.g. the LMF, including, for example, DRX information and/or MG information.

In 520, the network distributes the UE 402 configuration information to the positioning gNBs 404b and 404c. In 525, the positioning gNBs 404b and 404c (and the serving gNB 404a acting as a positioning gNB) monitor for the positioning SRS of the target UE 402 based on the UE configuration information. The gNBs 404b and 404c may monitor for a reduced duration, relative to a gNB having no knowledge of the UE configuration, thus saving resources of the gNB. In 530, the positioning gNBs 404a-c provide their respective SRS estimations to the network. In 535, the network determines a position of the UE 402 based on the SRS estimations provided by the positioning gNBs 404a-c.

Relative to the first exemplary aspect described above, in a first option, the UE may be configured in the following manner based on, for example, network specifications. The UE is configured so that periodic and semi-persistent positioning SRSs cannot be transmitted during the DRX inactive time, while aperiodic positioning SRSs are transmitted regardless of the active/inactive time for DRX. The UE may alternately or additionally be configured so that no type of positioning SRS (periodic, semi-persistent, or aperiodic) can be transmitted within the measurement gap (MG).

In the first option, the serving gNB 404a of the target UE 402 may send the DRX information for the UE 402 to the core network 130. For example, the gNB 404a may send the DRX information to the LMF via the NR Positioning Protocol A (NRPPa). The NRPPa includes procedures for handling the transfer of positioning related information between an NR node and the LMF. The DRX information may include (but is not limited to): DRX timing information, e.g. drx-LongCycleStartOffset, drx-ShortCycle, drx-Short-CycleTimer, drx-onDurationTimer, for indicating where the DRX active time and inactive time are for the UE, and a reference time for the DRX timeline that is used by the LMF to understand the absolute timing of the DRX on the UE. The reference time is used because the timing of the UE/gNB may be different from a local time at the LMF.

The serving gNB 404a of the target UE 402 may additionally or alternatively send UE measurement gap (MG)

information to the LMF via the NRPPa. The MG information may include (but is not limited to): MG timing information, e.g. MGRP (Measurement gap repetition period), MGL (Measurement gap length), MGTA (Measurement gap timing advance), and a reference time for the MG timeline. Similar to the DRX reference time, the MG reference time is used by the LMF to understand the absolute timing of the MG on the UE.

The LMF distributes the above mentioned DRX information (if used) and MG information (if used) to all positioning gNBs, e.g., gNBs 404b and 404c.

In other exemplary aspects, the UE 402 is configured in a similar manner to the first option. For example, the UE 402 is configured so that periodic and semi-persistent positioning SRSs are not transmitted during the DRX inactive time, while aperiodic positioning SRSs are transmitted regardless of the active/inactive time for DRX. The UE 402 is further configured so that no type of positioning SRS can be transmitted within the measurement gap (MG).

In these aspects, the positioning gNBs 404b-c do not receive any DRX or MG information from the serving gNB 404a. The positioning gNBs 404b-c will attempt to receive the positioning SRS from the UE 402 regardless of the DRX and MG status of the UE 402, e.g., the positioning gNBs 404b-c will listen for the positioning SRS from the UE 402 during a time period the gNBs 404b-c expect that the UE 402 is transmitting positioning SRS without regard to the DRX or MG status of the UE 402.

Relative to the first exemplary aspect described above, in a second option, a UE is configured so that periodic and semi-persistent positioning SRS are not transmitted during the DRX inactive time, while aperiodic positioning SRS are transmitted regardless of the active/inactive time for DRX, similar to the first option. However, in the second option, the UE may support a per-frame measurement gap. If the UE supports only per-UE MG (e.g., a same measurement gap applied to both FR1 and FR2), positioning SRS cannot be transmitted within the MG, similar to the first option. If the UE supports per-FR MG (e.g., two independent gap patterns are defined for FR1 and FR2, respectively), then the positioning SRS in FR1 cannot be transmitted within the FR1 MG, but may be transmitted within the FR2 MG. Positioning SRS in FR2 cannot be transmitted within the FR2 MG, but may be transmitted within the FR1 MG. If per-UE MG is configured by the network, then positioning SRS (in FR1 or FR2) cannot be transmitted within per-UE MG.

In the second option, similar to the first option, the serving gNB 404a of the target UE 402 may send the DRX information to the LMF via the NRPPa. The DRX information may include the same information discussed above relative to the first option, i.e., DRX timing information, e.g. drx-LongCycleStartOffset, drx-ShortCycle, drx-ShortCycleTimer, drx-onDurationTimer, for indicating where the DRX active time and inactive time are for the UE 402, and a reference time for the DRX timeline that is used by the LMF to understand the absolute timing of the DRX for the UE 402.

The serving gNB 404a of the target UE 402 may additionally or alternatively send UE measurement gap (MG) information to the LMF via the NRPPa. In the second option, the MG information includes the MG type, e.g. per-UE MG, FR1 MG or FR2 MG. The MG information may further include (but is not limited to): MG timing information, e.g. MGRP (Measurement gap repetition period), MGL (Measurement gap length), MGTA (Measurement gap timing advance), and a reference time for the MG timeline. The LMF distributes the above mentioned DRX (if configured) and MG information (if configured) to all positioning gNBs 404b-c.

In other exemplary aspects, the UE 402 is configured in a similar manner to the second option discussed above. For example, the UE 402 is configured so that periodic and semi-persistent positioning SRS are not transmitted during the DRX inactive time, while aperiodic positioning SRSs are transmitted regardless of the active/inactive time for DRX. If the UE 402 supports only per-UE MG (e.g., a same measurement gap applied to both FR1 and FR2), all types of positioning SRS cannot be transmitted within the MG. Otherwise, if the UE supports per-FR MG (e.g., two independent gap patterns are defined for FR1 and FR2, respectively), then the positioning SRS in FR1 cannot be transmitted within the FR1 MG, but may be transmitted within the FR2 MG. Positioning SRS in FR2 cannot be transmitted within the FR2 MG, but may be transmitted within the FR1 MG. If per-UE MG is configured by the network, then all types of positioning SRS (in FR1 or FR2) cannot be transmitted within per-UE MG.

In these exemplary aspects, the positioning gNBs 404b-c do not receive any DRX or MG information from the serving gNB 404a. The positioning gNBs 404b-c will attempt to receive the positioning SRS from the UE 402 regardless of the DRX status of the UE 402. For MG, the positioning gNBs 404b-c will attempt to receive the positioning SRS from the UE outside the corresponding MG duration.

In the exemplary aspects discussed above, the UE was limited to transmitting the periodic and SP positioning SRS during the DRX active state only. According to further exemplary aspects, the UE is allowed to transmit periodic and SP positioning SRS during the DRX inactive time.

In a first option, when the UE 402 is allowed to transmit the positioning SRS during the inactive time, the UE 402 may decide whether to transmit a configured periodical or SP positioning SRS during the DRX inactive time based on various considerations. For example, in one aspect, the UE 402 may determine to transmit or to not transmit based on a power consumption evaluation. In another aspect, the UE 402 may determine to not transmit a positioning SRS, or alternatively, to transmit the positioning SRS, if this positioning SRS is also configured for a purpose other than positioning (e.g. UL channel estimation).

In these aspects, all positioning gNBs 404a-c will monitor for the positioning SRS regardless of UE DRX status, even if it is uncertain as to whether the UE 402 will transmit the positioning SRS during the inactive period.

In a second option, when the UE 402 is allowed to transmit during the inactive period, the UE 402 may be required by the network to transmit a configured periodical or SP positioning SRS in the DRX inactive time. In these aspects, all positioning gNBs 404a-c will monitor all those positioning SRS regardless of UE DRX status.

Figure 6:
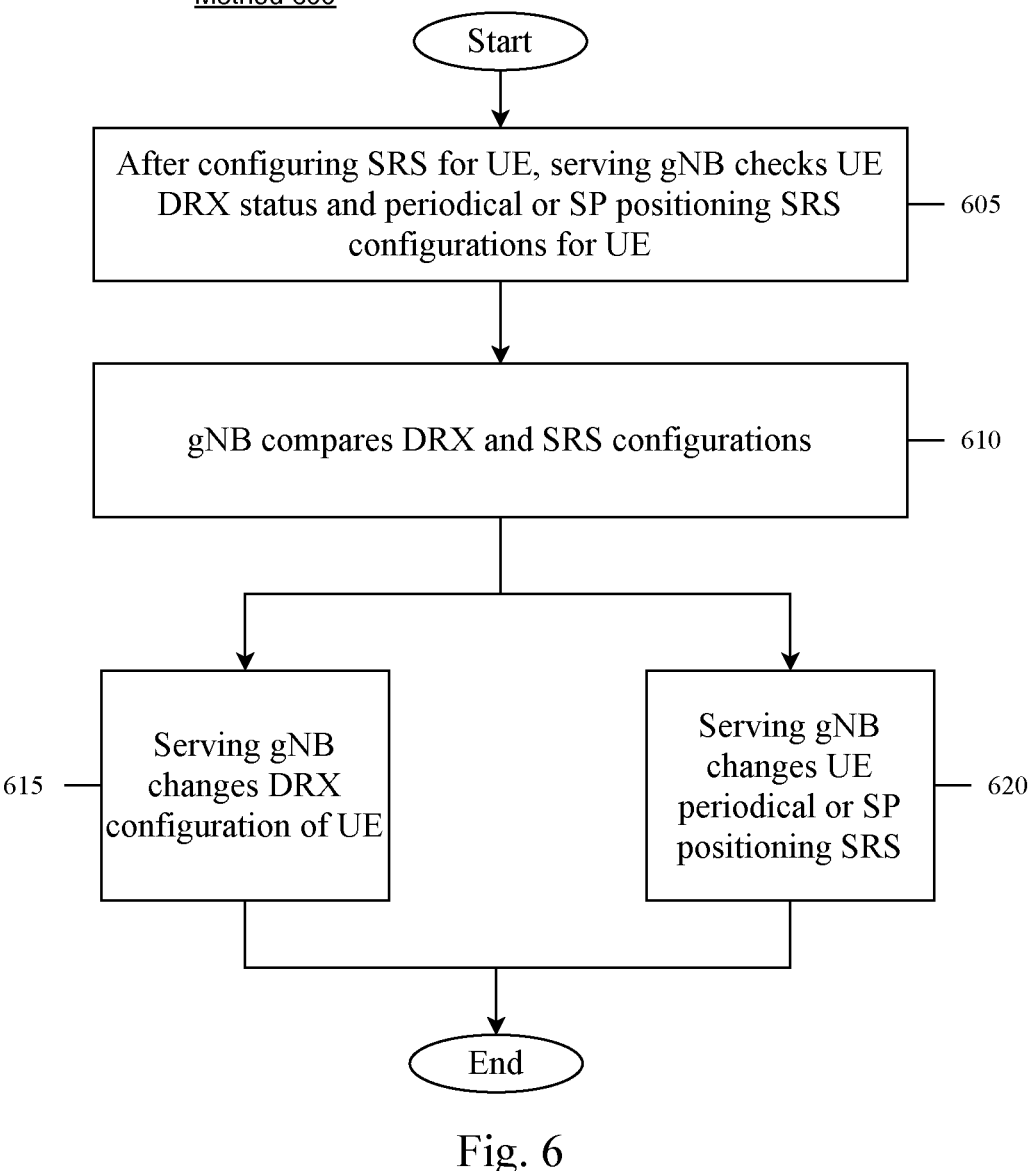
FIG. 6 shows a method for preventing a positioning SRS signaling period from being aligned with a DRX inactive time for a user equipment (UE).

In other exemplary aspects, the serving cell 404a may configure the UE 402 so that the SRS signaling period is not scheduled during a DRX inactive period. FIG. 6 shows a method 600 for preventing a positioning SRS signaling period from being aligned with a DRX inactive time for a user equipment (UE). In 605, after configuring the positioning SRS for the UE 402, the serving gNB 404a checks the UE DRX status and the periodical or SP positioning SRS configurations for the UE 402. In 610, the serving gNB 404a compares the DRX and SRS configurations. Specifically, the serving gNB 404a compares the timing of the DRX inactive time relative to the timing of the SRS transmission.

In 615, if the configured periodical or SP positioning SRS is located within the inactive time of the DRX, the serving gNB 404*a* changes the DRX configuration of the UE 402. In one option, the serving gNB 404*a* changes the DRX configuration so that the configured periodical or SP positioning SRS is located within the active time of the DRX. In another option, the serving gNB 404*a* changes the DRX configuration of the UE 402 to non-DRX. In non-DRX, the UE 402 is required to transmit all the configured periodical or SP positioning SRS at the allocated time.

Alternatively, in 620, if the configured periodical or SP positioning SRS is located within the inactive time of the DRX, the serving gNB 404*a* changes the UE 402 periodical or SP positioning SRS. In one option, the serving gNB 404*a* changes the periodical or SP positioning SRS of the UE 402 so that the re-configured periodical or SP positioning SRS is located within the active time of the DRX. In another option, the serving gNB 404*a* changes the periodical or SP positioning SRS of the UE 402 to aperiodical SRS. In an aperiodical SRS configuration, the UE 402 transmits the aperiodical positioning SRS based on a network indication.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. In a further example, the exemplary aspects of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A base station of a network acting as a serving node for a user equipment (UE), the UE being a target UE in a positioning method initiated by the network, comprising:
    one or more processors configured to:
    compare discontinuous reception (DRX) timing information for a DRX cycle of the UE with positioning sounding reference signal (SRS) timing information for an SRS configuration of the UE;

determine whether the positioning SRS is located within an inactive time of the DRX cycle; and
    when the positioning SRS is located within the inactive time of the DRX cycle, modifying one of the DRX cycle or the SRS configuration.

2. The base station of claim 1, wherein the DRX cycle is modified such that the positioning SRS is located within an active time of the DRX cycle.

3. The base station of claim 1, wherein the DRX cycle is modified to a non-DRX.

4. The base station of claim 1, wherein the positioning SRS is a periodical positioning SRS or a semi-persistent positioning SRS.

5. The base station of claim 1, wherein the SRS configuration is modified such that a reconfigured positioning SRS is located within an active time of the DRX cycle.

6. The base station of claim 1, wherein the SRS configuration is modified to an aperiodical positioning SRS.

7. A method, comprising:
    at a base station of a network acting as a serving node for a user equipment (UE), the UE being a target UE in a positioning method initiated by the network:
    comparing discontinuous reception (DRX) timing information for a DRX cycle of the UE with positioning sounding reference signal (SRS) timing information for an SRS configuration of the UE;
    determining whether the positioning SRS is located within an inactive time of the DRX cycle; and
    when the positioning SRS is located within the inactive time of the DRX cycle, modifying one of the DRX cycle or the SRS configuration.

8. The method of claim 7, wherein the DRX cycle is modified such that the positioning SRS is located within an active time of the DRX cycle.

9. The method of claim 7, wherein the DRX cycle is modified to non-DRX.

10. The method of claim 7, wherein the positioning SRS is a periodical positioning SRS or a semi-persistent positioning SRS.

11. The method of claim 7, wherein the SRS configuration is modified so that a reconfigured positioning SRS is located within an active time of the DRX cycle.

12. The method of claim 7, wherein the SRS configuration is changed to an aperiodical positioning SRS.

13. A non-transitory computer readable storage medium comprising a set of instructions that when executed by a processor of a base station causes the processor to perform operations, comprising:
    compare discontinuous reception (DRX) timing information for a DRX cycle of a user equipment (UE) with positioning sounding reference signal (SRS) timing information for an SRS configuration of the UE;
    determine whether the positioning SRS is located within an inactive time of the DRX cycle; and
    when the positioning SRS is located within the inactive time of the DRX cycle, modifying one of the DRX cycle or the SRS configuration.

14. The non-transitory computer readable storage medium of claim 13, wherein the DRX cycle is modified such that the positioning SRS is located within an active time of the DRX cycle.

15. The non-transitory computer readable storage medium of claim 13, wherein the DRX cycle is modified to a non-DRX.

16. The non-transitory computer readable storage medium of claim 13, wherein the positioning SRS is a periodical positioning SRS or a semi-persistent positioning SRS.

17. The non-transitory computer readable storage medium of claim 13, wherein the SRS configuration is modified such that a reconfigured positioning SRS is located within an active time of the DRX cycle.

18. The non-transitory computer readable storage medium of claim 13, wherein the SRS configuration is modified to an aperiodical positioning SRS.

* * * * *